3,265,797
METHOD OF INJECTION MOLDING SOLID HEAVY SECTION

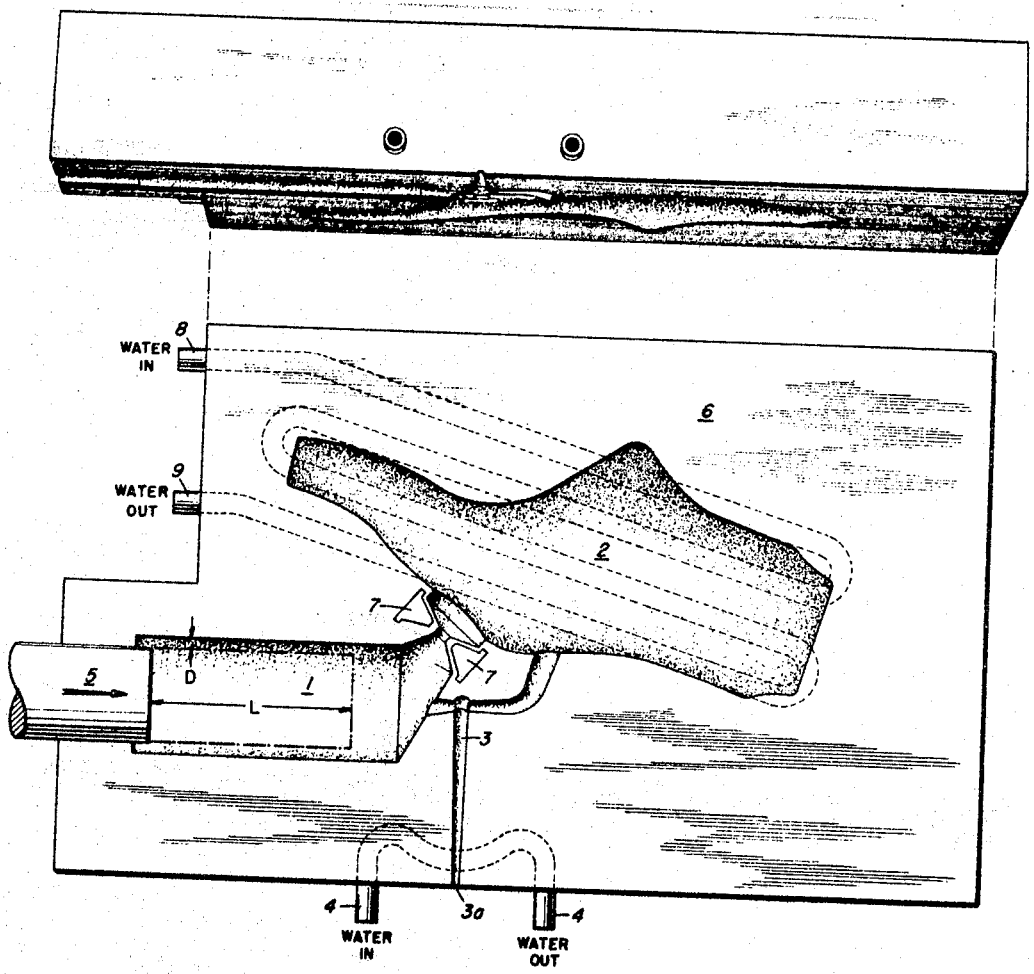
ALBERT SPAAK
CLIFFORD L. WEIR
INVENTORS

Albert Spaak, Little Falls, N.J., and Clifford L. Weir, Long Island, N.Y., assignors to W. R. Grace & Co., a corporation of Connecticut
Filed Aug. 30, 1962, Ser. No. 220,960
1 Claim. (Cl. 264—235)

The present invention relates to a novel and useful molding process. More particularly it relates to an improved molding process which is particularly suitable for molding plastics to produce heavy sections with substantially no void areas.

It is known in the art that various plastics may be fabricated into useful articles utilizing injection molding principles. However, many plastics such as polyethylene and polyproplyene shrink from 20% to 30% or more when they are transformed from a liquid at an elevated temperature to a solid at ambient temperatures. Accordingly, when an article is injection molded, an outside solid shell forms in the mold upon cooling and the liquid center upon solidification produces voids. In many instances, as in the injection molding of small parts, the voids produced are not of particular significance since they are quite small and few in number. However, when molding heavy sections, and particularly those having a dimension of at least ¾ inch in all directions from the center, voids one half inch or larger can be formed and these materially affect the strength and practical utilization of the article.

Recently an apparatus has been developed which provides a molten reservoir of plastic and a means for applying pressure to the reservoir to force liquid plastic from the reservoir into the mold cavity to compensate for the volume change which takes place upon solidification of the polymer. Such an apparatus is described in copending application Serial No. 220,529, filed August 30, 1962. However, even when utilizing such an apparatus, small voids often appear in the final product due to the fact that solidification takes place in front of the reservoir connection to the mold cavity shutting off the supply from the reservoir. While it is true that internal voids could be substantially eleminated by the use of this apparatus containing an auxiliary heating unit in this area of the mold, such a heating unit invariably increases the molding cycle. Obviously, if a process could be developed which would accomplish the same results while shortening the molding cycle, it would receive widespread acceptance in the injection molding field.

It is an object of the present invention to provide an improved process which will produce plastic articles of heavy section with the substantial elimination of the void areas formed in the articles. Another object is to provide an improved process which may be utilized with a conventional injection molding machine without material lengthening of the molding cycle. A still further object is to provide an improved process which requires little additional equipment other than that already required for injection molding techniques. Other objects will become apparent as the description of the invention proceeds.

These objects are accomplished by the present invention which provides an improvement in the process for molding an article of heavy section by injecting a molten plastic into a mold cavity and reservoir, sealing the system and thereafter simultaneously cooling the mold cavity while applying pressure to the molten plastic in the reservoir to force plastic from the reservoir into the mold cavity to compensate for the volume change attending the solidification of the plastic in the mold cavity, the improvement comprising continuing the cooling for a time sufficient to make the article rigid and removable from the mold but insufficient to completely solidify the plastic in the central portion of the article, and thereafter heating the rigid article containing the unsolidified plastic for at least 1 hour at about 140° F. to a temperature about 5° F. below the melting point of the plastics so as to substantially eliminate voids in the final article.

In a preferred embodiment of the present invention, the plastic is a high density polyethylene and the cooling is continued for about 1 to about 30 minutes at which time the article is removed from the mold and heated for at least about 4 hours at a temperature of at least about 145° F. In a still more preferred embodiment, the article is heated at a temperature of from about 220° F. to about 260° F. for a period of from about 12 to about 24 hours.

While the present invention is particularly suitable for the molding of polyolefins, it may be used with any of the thermoplastic materials known in the art which shrink upon solidification. For example other suitable thermoplastic materials include the polycarbonamides, linear polyesters and the like. Many others are likewise known and may be utilized as desired.

The invention is hereinafter more fully described by reference to the drawing.

In the figure, which shows schematically a two-section partially open mold particularly suited for carrying out the improved process of the present invention, the reservoir 1 is flowably connected to the mold cavity 2 which in turn is flowably connected to the inlet port 3. The body of the mold 6 houses the entire assembly which is divided into two break-away sections although more sections may be used in other types of molds. In operation, the assembled mold is positioned on a conventional injection molding machine and the liquid plastic is injected through the inlet end 3a of the inlet port 3 to completely fill the mold cavity 2 and reservoir 1. The inlet port 3 is gradually constricted towards the inlet end 3a so that as a cooling fluid is passed through a cooling means 4 the plastic in the inlet port is solidified to form a plug which resists any pressure transmitted to it from the mold cavity 2. After solidification of the plug, pressure is applied to the plunger 5 while simultaneously cooling the mold cavity 2 by means of a liquid circulating through the inlet 8 and the exit 9. As the plastic solidifies, it contracts in the mold cavity 2 and the plunger 5 advances under pressure to force additional plastic from the reservoir into the mold cavity to compensate for the volume change attending the solidification of the liquid plastic in the mold cavity 2. The distance D is at least 1/16 of an inch along the length of normal movement L of the plunger 5 so that any solidification of the polymer around the walls of the reservoir 1 will not interfere with the progress of the plunger 5. Consequently, any volume change occurring within the mold cavity is substantially taken up by the plastic from the reservoir. As an optional feature of the invention, the mold is provided with an electrical (or other) heating means 7 for heating the mold in the area adjacent the connection of the reservoir to the mold cavity.

The following examples are given to illustrate the invention and are not intended to limit it in any manner.

EXAMPLES

*Control procedure*

A mold is constructed as described in the drawing (omitting the heating means 7 as shown) with a mold cavity in the form of a rough shoe last having the approximate shape shown in the drawing. The approximate dimensions of the mold cavity with relation to the molded product, are length (heel to toe) 12½ inches, maximum width (side to side) 4½ inches, maximum height (sole portion to top) 5½ inches, and a thickness (side to side) which varies from 1¼ to 4¼ inches. The reservoir is cylindrical in shape with a length of about 6 inches and a diameter of 2½ inches. The plunger in the reservoir is also cylindrical in shape with a length of about 8 inches and a diameter of 2⅛ inches. A commercial high density polyethylene homopolymer plastic having a density of 0.960 and a melt index of 5.0 is injected into the mold at a temperature of 340° F. The inlet port is immediately cooled with water to selectively solidify the polymer in this portion of the mold. Water is then run through the mold to cool the mold to a temperature of about 110° F. while simultaneously applying a pressure of about 5,000 p.s.i. to the plunger which initially is even with the end wall of the reservoir. As cooling in the mold cavity takes place, the plunger advances a total distance of about 5½ inches within the reservoir to compensate for the volume change attending the solidification of the liquid polymer in the mold cavity. After complete solidification, in about 2 hours, the plunger is retracted and the resulting shoe form is removed from the mold.

The approximate weight of the shoe form (including the solidified plastic left in the inlet port and around the plunger in the reservoir) is approximately 3.25 lbs. Upon cutting the shoe form lengthwise through the middle with a saw, a few small voids are evident in the center of the molded product.

*Example 1.*—The above-described control procedure is repeated with the exception that the molded article is removed from the mold after it is cooled for a period of about 10 minutes. The article is completely solidified for a distance of less than ¾ of an inch from the outside surface, but is rigid, dimensionally stable and can be removed from the mold. Upon removal from the mold, the article is placed overnight (about 16 hours) in an oven heated to a temperature of 240° F., before air-cooling to room temperature.

Upon cutting the shoe form lengthwise through the middle with a saw, no voids whatsoever are evident in the product. The shoe form is then cut widthwise through the heavier sections and again no voids are evident.

*Example 2.*—The procedure of Example 1 is repeated with the exception that the molded article upon removal from the mold is heated at a temperature of 220° F. for a period of 24 hours.

When the molded article is cut lengthwise and widthwise as in Example 1 again no voids are noted.

*Example 3.*—The procedure of Example 1 is repeated with the exception that the molded article upon removal from the mold is heated at a temperature of 260° F. for a period of 12 hours.

When the molded article is cut lengthwise and widthwise as in Example 1 again no voids are noted.

*Example 4.*—When the procedure of Example 1 is repeated employing a heating period of 145° F. for about 5 hours, substantially the same results are obtained.

As demonstrated by the examples, the molding cycle can be cut from what is probably an hour or more to a matter of a few minutes. In general, a cooling cycle of from about 1 to about 30 minutes is suitable for normal moldings. However, it is obvious that the time required will depend upon the particular plastic employed, the injection temperature, the temperature of the mold, the rate of heat transfer through the mold and the like. For heavy section moldings which do not exceed about 6 inches in thickness, a cooling time of from about 10 to about 15 minutes is suitable.

The process of the present invention can be used to produce articles of heavy section such as shoe lasts, bowling pins, toys, paper weights, book ends and the like.

While the invention has been described with reference to specific embodiments, many equivalent modifications will be apparent to those skilled in the art from a reading of the foregoing without a departure from the inventive concept.

What is claimed is:

In the process for molding an article of heavy section by injecting a molten polyolefin plastic into a mold cavity and reservoir, sealing the system and thereafter simultaneously cooling the mold cavity while applying pressure to the molten polyolefin plastic in the reservoir to force polyolefin plastic from the reservoir into the mold cavity to compensate for the volume change attending the solidification of the polyolefin plastic in the mold cavity, the improvement which comprises continuing the cooling for a time sufficient to make the article rigid and removable from the mold but insufficient to completely solidify the polyolefin plastic in the central portion of the article, and thereafter heating the rigid article containing the unsolidified polyolefin plastic for at least about 4 hours at a temperature of from about 220° F. to about 260° F. so as to substantially eliminate voids in the final article.

References Cited by the Examiner

UNITED STATES PATENTS

| | | | |
|---|---|---|---|
| 2,355,613 | 8/1944 | Wacker | 18—42 |
| 2,372,630 | 3/1945 | Smith | 264—235 |
| 2,689,376 | 9/1954 | Wacker. | |
| 2,781,547 | 2/1957 | Moxness | 264—328 XR |
| 3,009,206 | 11/1961 | Salyer et al. | 264—235 |
| 3,044,118 | 7/1962 | Bernhardt et al. | 264—328 XR |

ROBERT F. WHITE, *Primary Examiner.*

ALEXANDER H. BRODMERKEL, *Examiner.*

J. R. DUNCAN, R. B. MOFFITT, *Assistant Examiners.*